United States Patent [19]
Keating et al.

[11] 3,851,640
[45] Dec. 3, 1974

[54] DEEP FAT FRYER WITH CONTROLLABLE HEAT-UP FOR COLD FAT MELT

[76] Inventors: Richard T. Keating, 144 N. Cuyler Ave., Oak Park, Ill. 60300; Richard T. Keating, Jr., 234 W. 79th St., Clarendon Hills, Ill. 60514

[22] Filed: Apr. 27, 1973

[21] Appl. No.: 354,946

Related U.S. Application Data

[63] Continuation-in-part of Ser. No. 225,165, Feb. 10, 1972, abandoned.

[52] U.S. Cl..................... 126/391, 236/20, 236/1 E, 99/331
[51] Int. Cl. ............................................. A47j 27/26
[58] Field of Search .......... 431/62, 63, 73; 126/391; 236/1 E, 20; 99/331

[56] References Cited
UNITED STATES PATENTS

| | | | |
|---|---|---|---|
| 2,241,296 | 5/1941 | Dillman | 431/63 X |
| 2,246,854 | 6/1941 | Meletio | 99/331 X |
| 2,266,563 | 12/1941 | McCorkle | 236/1 E UX |
| 2,329,682 | 9/1943 | Alfery | 236/1 E |
| 2,846,147 | 8/1958 | Keating | 126/391 UX |
| 3,672,811 | 6/1972 | Hron | 431/73 X |

*Primary Examiner*—Charles J. Myhre
*Assistant Examiner*—William C. Anderson
*Attorney, Agent, or Firm*—Rummler & Snow

[57] ABSTRACT

A deep fat fryer with two-stage fuel flow control for slowly melting newly packed or solidified fat without overheating and burning followed by thermostatically-controlled high heat of a liquid fat bath for frying.

5 Claims, 10 Drawing Figures

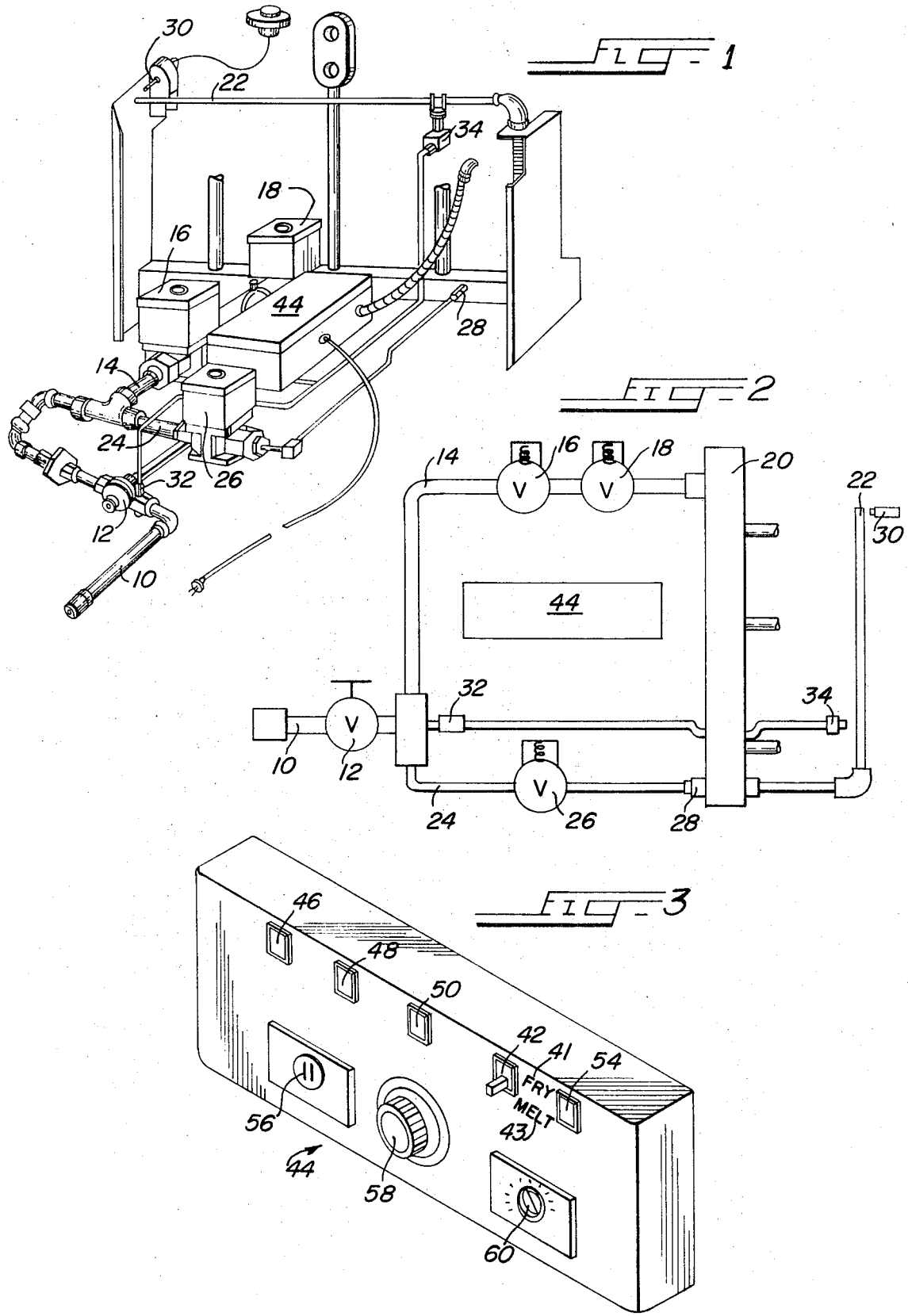

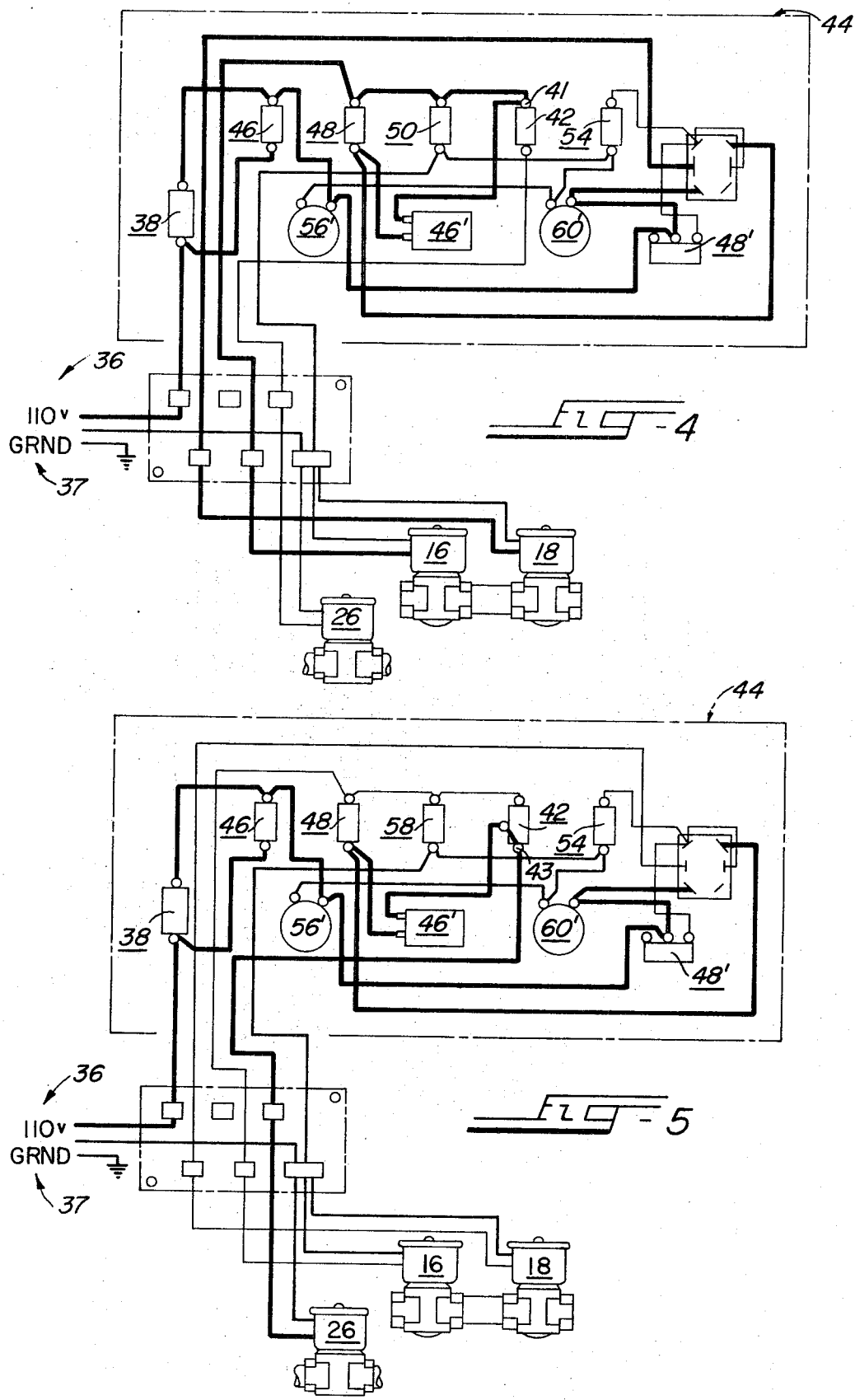

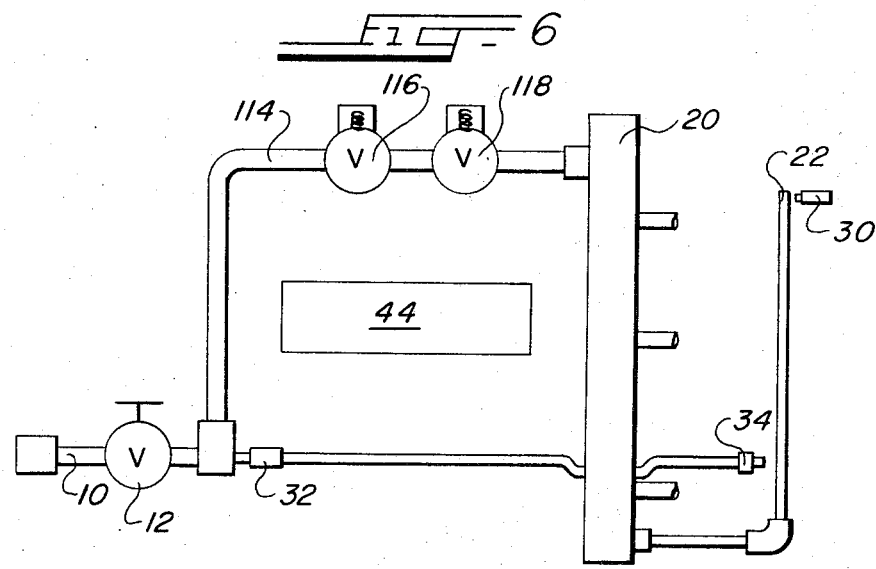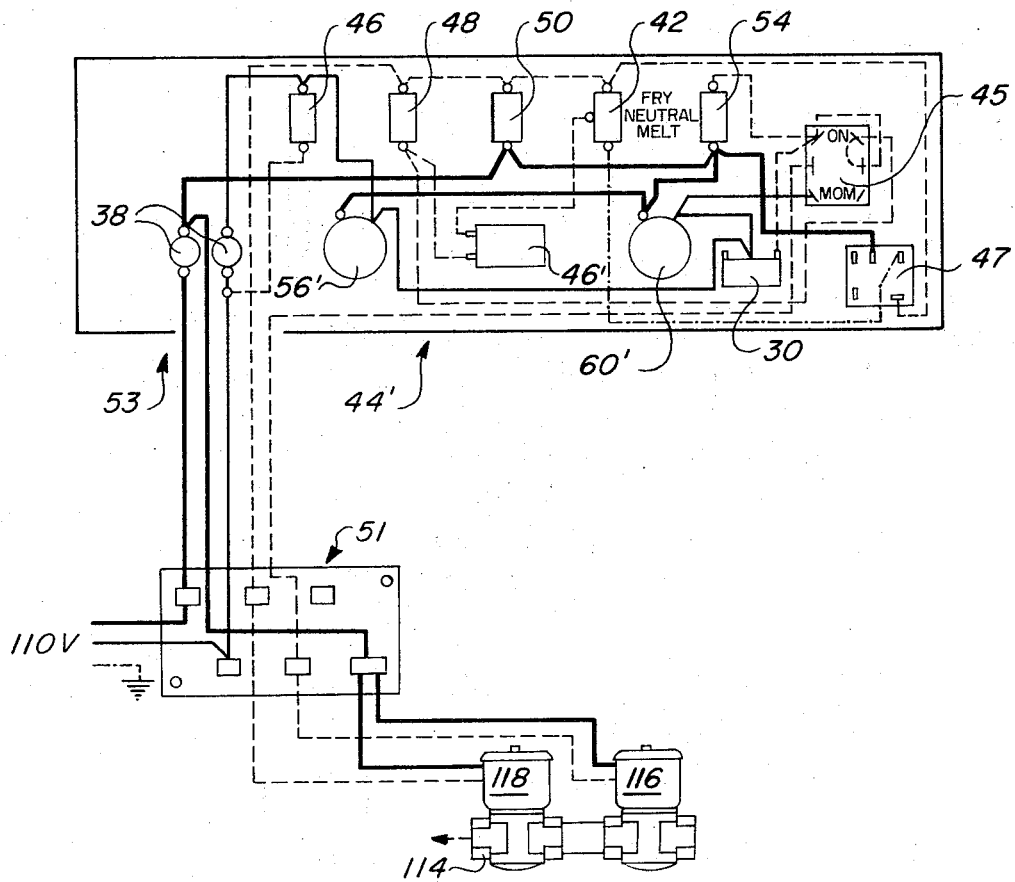

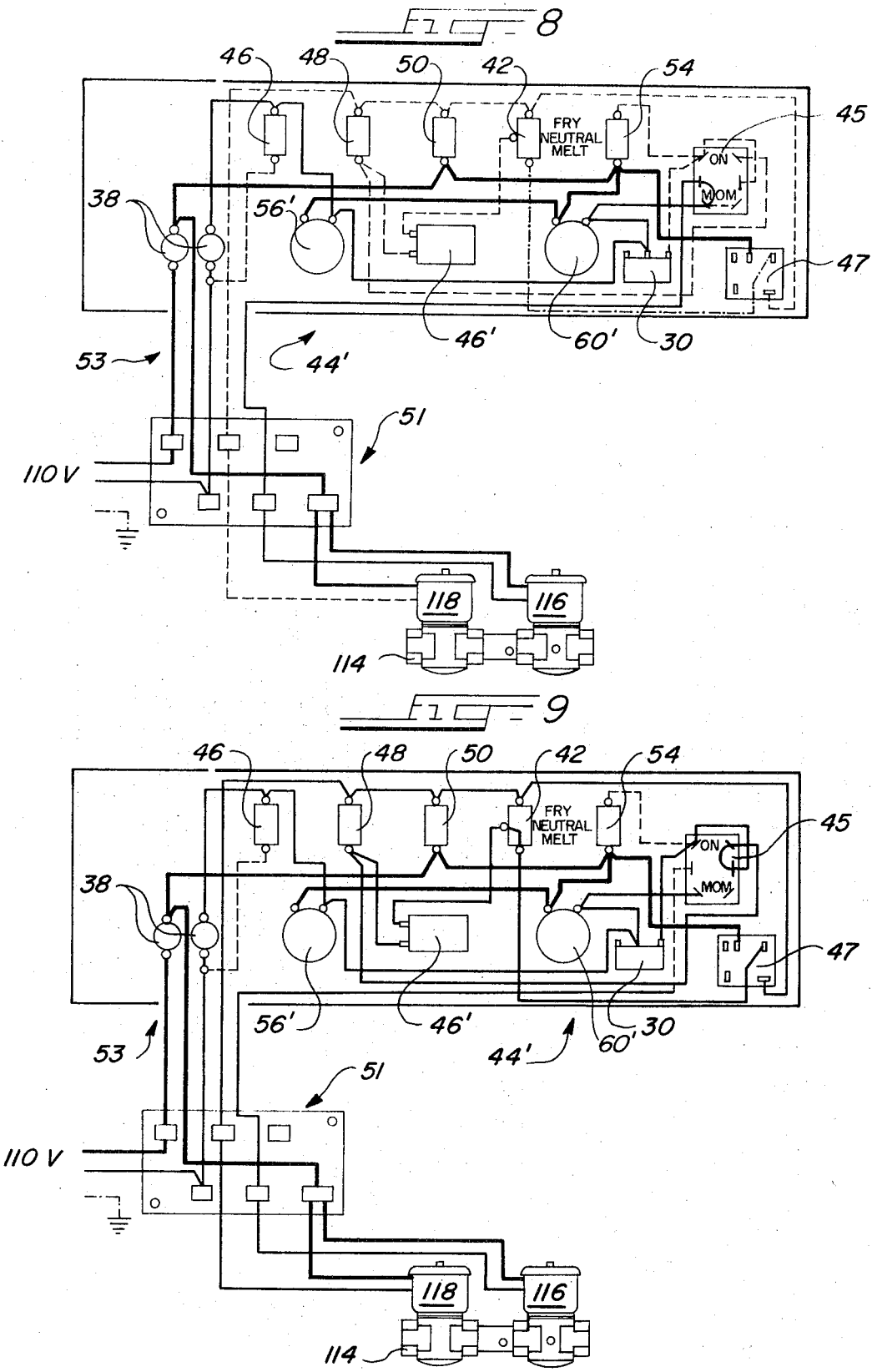

DEEP FAT FRYER WITH CONTROLLABLE HEAT-UP FOR COLD FAT MELT

CROSS-REFERENCE TO RELATED APPLICATION

This application is a continuation-in-part of my co-pending application, Ser. No. 225,165, filed Feb. 10, 1972 and is now abandoned.

BACKGROUND OF THE INVENTION

Twenty years ago, the American Standard requirement provided that a deep fat fryer should heat-up at a rate of not less than 8.86° Fahrenheit per minute whereas today fryers heat at a rate of 56° Fahrenheit per minute.

As the heat input to deep fay fryers has been increased over the years, a problem has developed. This problem, in particular, arises with solid fat newly packed in the fryer. Following periodic removal and replacement of the used fat, solidified new fat is packed down around the heat transfer tubes of a conventional deep fat fryer. When the tubes are heated at the normal rate, the fat in contact with the tubes melts quickly and falls away leaving cavities with nothing to quickly conduct the heat to the remaining fat. It is at these cavities where the fat is not in contact with the tubes that a problem of overheating of the tube and carmelizing residual fat thereon arises.

Thus, when the usual fryer is first turned on, the tube adjacent to a cavity where there is no fat to absorb the heat generated therefrom elevates in temperature. This temperature rises sufficiently so that any grease remaining on the heat transfer tubes carbonizes and causes a varnish-like deposit to adhere to the tubes. In extreme cases, when the fat cavitates away from the surface of the heat transfer tubes, the tubes can attain such a high temperature that the fat actually breaks into flame. This deposit builds up on the tubes as time goes on requiring extensive periodic cleaning of the fryer and the boiling out of the fryer with a causticlike material.

There is thus an established need for a deep fat fryer with a two-stage heat rate for melting and frying operations.

SUMMARY OF THE INVENTION

The gist of this invention lies in a two-stage heating system for a deep fat fryer wherein a first stage gas plumbing circuit limits the total flow of fuel gas to the burner of a deep fat fryer in a given time to a level only sufficient for melting the solid fat in the fryer. When enough of this solid fat is melted to flood the heating tubes of the fryer, a manual switchover to a second stage gas plumbing circuit supplies fuel to the burner at a higher level sufficient to maintain the fat liquid during frying at the temperature desired.

In one concept of two-stage fuel flow control, called a "twin-line" melter-fryer, fuel to the fryer is supplied through two separate plumbing circuits:

1. A primary plumbing circuit having a flow control valve installed therein for supplying the fryer burner with fuel sufficient to maintain the fat liquid at a regulated frying temperature; and 2. A secondary plumbing circuit having a flow control valve installed therein for supplying the fryer burner with limited fuel only sufficient to melt the solid fat in the fryer without burning or charing the fat.

Switchover from secondary flow to primary flow is done when the solid fat is melted.

In another concept called a "single-line" melter-fryer, both the primary and secondary fuel gas flows are supplied to the burner through the same plumbing circuit. Two-stage flow in the single plumbing line to the burner of the melter-fryer is limited during secondary flow by intermittently opening and closing a flow control valve in the single plumbing circuit for varying lengths of time as controlled by a timing device, and maintained a maximum during primary flow by holding the same valve fully open all the time. Switchover from secondary flow to primary flow is made when all the solid fat is melted.

DESCRIPTION OF THE DRAWINGS

In the following drawings, a light line signifies a "hot" line, a heavy line a ground line and a dotted line an unused line in the particular electrical circuit hook-up being used.

FIG. 1 is a perspective view of a two-stage, twin supply line plumbing circuit for a gas-burning, deep-fat fryer with controlled heat-up for melt;

FIG. 2 is a schematic diagram of a twin supply line, two-stage plumbing circuit;

FIG. 3 is a perspective view of the control panel having a momentary switch for start-up and a main switch for manually selecting fry over melt for a two-stage plumbing circuit;

FIG. 4 is a wiring diagram for the twin supply line, two-stage plumbing circuit electrically hooked up for fry;

FIG. 5 is a wiring diagram for the twin supply line, two-stage plumbing circuit electrically hooked up for melt;

FIG. 6 is a schematic diagram of a two-stage single supply line plumbing circuit;

FIG. 7 is a wiring diagram for the single supply line, two-stage plumbing circuit electrically hooked up to "off" operation;

FIG. 8 is a wiring diagram for the single supply line, two-stage plumbing circuit electrically hooked up for "start-up" with runner tube off;

FIG. 9 is a wiring diagram for the single supply line, two-stage plumbing circuit electrically hooked up for "melt" with runner tube lit.

THE PREFERRED EMBODIMENT

Figure 10:
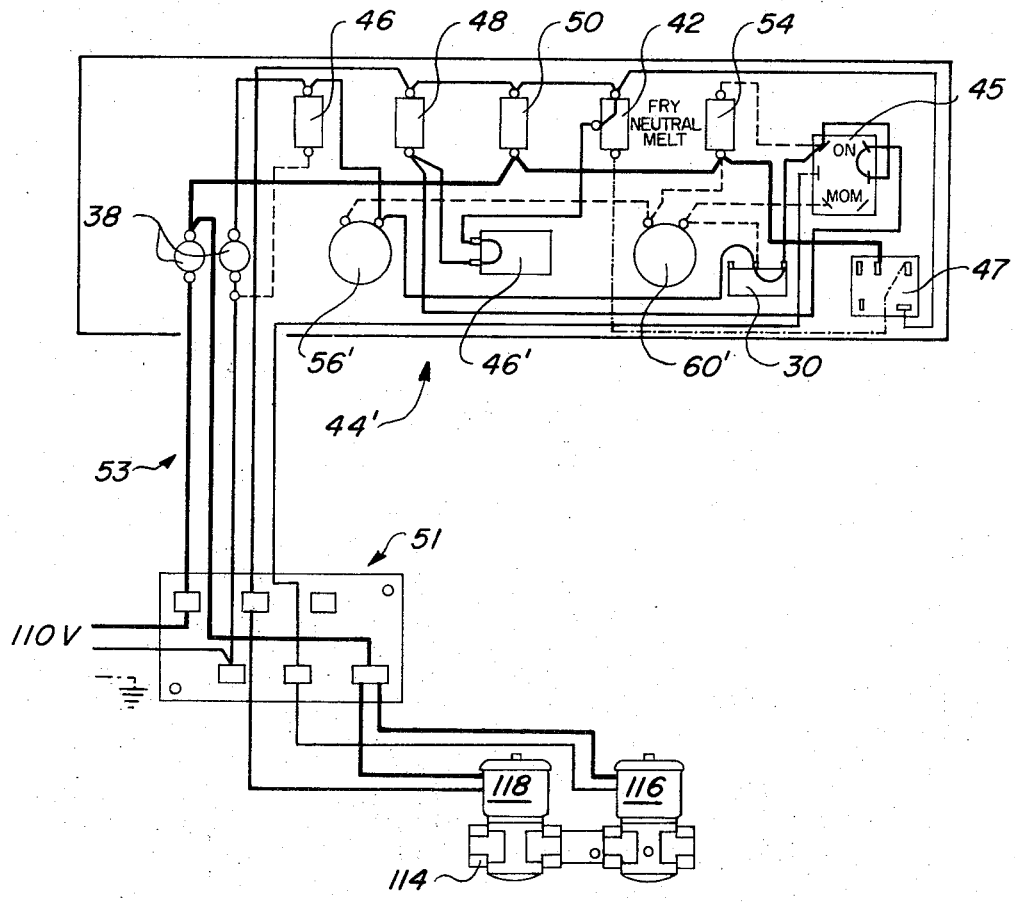
FIG. 10 is a wiring diagram for the single supply line, two-stage plumbing circuit electrically hooked up for "fry."

Referring to the drawings, particularly FIGS. 1 and 2, which show the twin supply line piping and valve assembly for a two-stage melter-deep fat fryer, wherein the gas flow circuit 11 comprises a gas supply main 10, a gas cock 12 which is in fluid communication with the gas main 10, a primary gas line 14 which is in fluid communication with the outlet of said gas cock 12 having a solenoid-operated flow control valve 16 fluid communicated therein, a solenoid-operated safety valve 18 which is in fluid communication with said flow control valve 16, and a manifold 20 which is in fluid communication with said safety valve 18. The main burners of the fryer are supplied with gas from the manifold 20. A runner tube 22 which is in fluid communication with said manifold 20 maintains a light of all main burners of the fryer when gas cock 12 is open and valves 16 and 18 in primary gas line 14 are in the open position. A pilot adjuster valve 32 which is in fluid communication with said gas cock 12, and a perpetual pilot light 34 which is in fluid communication with said adjuster valve 32, provide for a perpetual light-up of the runner tube 22.

Bypassing said primary gas line 14 is a secondary gas line 24 which is in fluid communication with said gas cock 12. A solenoid-operated flow control valve 26 is fluid communicating in the secondary gas line 24. A flow control orifice 28 is in fluid communication with said solenoid valve 26 in gas line 24, and manifold 20 is in fluid communication with said orifice 28. The operation of primary gas system 14 and secondary gas system 24 is mutually exclusive in that when valve 26 is open, valve 18 is automatically closed, and vice versa.

Referring to FIGS. 2 and 3 showing a control panel and electrical box 44 for the twin-line melter-fryer which has a red indicating light 46 electrically connected to the thermostat 46' for indicating a defective thermostat, as shown in FIG. 4. An indicating light 48 is electrically connected to a normally-open flame switch 30 for indicating when the main burners are off during either melt or fry. An indicating light 50 is electrically connected to solenoid flow-control and safety valves 16 and 18 for indicating when the main burners are on during either melt or fry. A double-throw, single-pole main switch 42 is electrically connected to solenoid valves 16, 18 and 26 for manual switchover of the system from melt to fry operation. When main switch 42 is thrown in "melt" position 43, as shown in FIGS. 3 and 5, the secondary gas line 24 supplies the limited gas flow to manifold 20 and to the fryer burners and the primary gas flow system 14 is shut off, and when said main switch 42 is thrown in the "fry" position 41, as shown in FIGS. 3 and 4, the secondary gas system 24 is shut off and the primary gas flow system 14 supplies gas to manifold 20 and to the fryer burners. An indicating light 54, as shown in FIGS. 3 and 4, which is electrically connected to runner tube 22, indicates when the runner tube 22 is burning. A first timer knob 56 is operationally connected to a timer 56' and a second timer knob 60 is operationally connected to a timer 60', as shown in FIGS. 3 and 4, each of which sound a buzzer and indicate the elapsed cooking cycles of the fryer. A knob 58, which is operationally connected to the thermostat 46', as shown in FIGS. 3 and 4, controls the temperature setting of the fryer.

The flame switch 30, which is in heat communication with the runner tube 22, senses a flame-out of the tube 22 and electrically shuts off the primary and secondary gas lines 14 and 24, shown in FIGS. 1 and 2, by closing valve 16 when the main switch 42 is set in "Fry" position and by closing valve 26 when the main switch is set in "Melt" position, as shown in FIGS. 4 and 5. The flame switch 30 connects to the 110-volt A.C. power supply 36 through the main switch 42 for both "melt" 43 and "fry" 41 settings so that in the instance of a flame-out, the flame switch 30 shuts either the primary gas line 14 or the secondary gas line 24, whichever may be operating.

Referring to FIG. 4, the electrical control circuit in the box 44, as energized for primary gas flow in the two-stage, twin supply line plumbing circuit, comprises the 110-volt A.C. power supply 36, the fail-safe, high-limit heat fuse 38 which is in electrical connection with the power supply 36, the thermostat 46' which is in electrical connection with the high-limit heat fuse 38, the doublethrow, single-pole main switch 42, the "fry" position 41 of which is in electrical connection with the thermostat 46', a solenoid-operated flow control valve 16 which is in electrical connection with flame switch 30 and the "fry" position 41 of the main switch 42, a solenoid-operated flow control safety valve 18 which is in electrical connection with the "fry" position 41 of main switch 42, and the ground connection 37 which is in electrical connection with both the flow control valve 16 and the safety valve 18.

Referring to FIG. 5, the electrical control circuit in the box 44, as energized for secondary gas flow in the two-stage, twin supply line plumbing circuit, comprises a 110-volt A.C. power source 36, a fail-safe, high-limit heat-fuse 38 which is in electrical connection with the power supply 36, a thermostat 46' which is in electrical connection with the high-limit heat-fuse 38, the double-throw, single-pole main switch 42, the "melt" position 43 of which is in electrical connection with the thermostatic regulator 46', a solenoid-operated flow control valve 26 which is in electrical connection with flame switch 30 and the "melt" position 43 of the main switch 42, and a ground connection 37 which is in electrical connection with the solenoid-operated flow control valve 26.

Referring to FIG. 6, which shows the manifold for a single-supply line, two-stage melter-fryer burner assembly comprising a gas main 10, a gas cock 12 which is in fluid communication with the gas main 10, a gas line 114 which is in fluid communication with the gas cock 12 and having a normally closed, solenoid-operated flow control valve 116 which is in fluid communication with said gas cock 12, a normally open, solenoid-operated valve 118 which is in fluid communication with the flow control valve 116, a manifold 20 which is in fluid communication with said flow control valve 118 and a runner tube 22 which is in fluid communication with said manifold 20. A pilot adjuster valve 32 is in fluid communication with said valve 116, a perpetual pilot light 34 is in fluid communication with said adjuster 32, and said runner tube 22 is in fluid communication with said perpetual pilot 34 for perpetual light-up of the runner tube 22. A normally open flame switch 30, which is in heat communication with the runner tube 22, senses a flame-out of the tube 22 and electrically shuts off the gas flow in the line 114.

Referring to FIG. 6, which shows the single supply line piping and valve assembly for a two-stage melter-deep fat fryer. The electrical circuit hook-ups for a typical off, start-up, melt and fry duty cycle of the deep fat melter-fryer, as shown in FIGS. 7, 8, 9 and 10, comprise a terminal block 51 which is electrically connected to 110-volt, single-phase A.C. power supply outlet. A control panel and electrical box 44' for the single-line melter-fryer connects to the terminal block 51 through an electrical control circuit 53. Control panel and electrical box 44' in the single supply line 114, two-stage burner assembly is similar to control panel and box 44 for the twin-supply line assembly with the important difference that a fat melter control 47 is connected in series with the main switch 42 and is operative in controlling the total heat flow in a given time to the melter-fryer when the circuit is switched to the "melt" position 43. Fat melter control 47 has the characteristic of an "infinite timer" in that after a first rated delay period (25–30 seconds), an energized heater closes the contacts of a relay in the electrical heat control circuit 53 for an adjustable pulsed period (3–5 seconds) after which the contacts open another adjustable rated delay period in cyclical repetition.

In the "off" setting of the fat melter-fryer, as shown in FIG. 7, the gas cock 12 is open allowing gas flow to the fryer and no electrical current is flowing in the control circuit 53 so that the normally closed solenoid valve 116 is closed shutting gas flow to the fryer while normally open solenoid valve 118 is open. The main switch 42 is in the "neutral" position between the "melt" 43 and the "fry" 41 position. A spring switch 45 is in the normally-on position. The control panel and box 44' electrical hook-up comprises a high limit heat-fuse 38 electrically connected to the terminal box 51. One "momentary" contact of a spring switch 45 and the common contact of flame switch 30 are in open-circuit parallel electrical connection with the heat-fuse 38. The normally-open contact of the flame switch 30 is connected to one "on" contact and to the other common terminal of the spring switch 45. Main switch 42 is in the "neutral" position making connection with neither the "fry" contact nor the "melt" contact thereon and the spring switch 45 is in the normally "on" position. Thermostat 46' is connected to the other "on" contact of spring switch 45. The common pole of main switch 42 is connected to the thermostat 46'. The common terminal of fat melter control 47 is connected to the "melt" contact of the main switch 42. One of the terminals of the fat melter control 47 is connected to the ground and the other terminal is connected to the "high" side of the solenoid of flow control valve 118. The "fry" contact of main switch 42 is also connected to the other terminal of the fat melter control 47. The other terminal on solenoid valve 118 is connected to ground 37. The "high" side terminal on the normally closed solenoid valve 116 is connected to one common terminal of the spring switch 45. The other common terminal and the other "on" contact within spring switch 45 are internally closed but open-circuited therein in the "off" setting of the melter-fryer. The other terminal on solenoid valve 116 is connected to ground 37.

During start-up of the fat melter-fryer, as shown in FIG. 8, the main switch 42 is still in the "neutral" position and the spring switch 45 is thrown to the "momentary" position. The runner tube 22 is not yet lit by the perpetual pilot 34 and the flame switch 30 is bypassed. The control panel and box 44 electrical hook-up comprises a high limit heat-fuse 38 connected to the terminal box 51. The common contact of flame switch 30 and one "momentary" contact of the spring switch 45 are connected in parallel with the heat-fuse 38. The normally open contact of the flame switch 30 is connected to one "on" contact and to the other common terminal of the spring switch 45. In the absence of flame in the runner tube 22, the common contact in flame switch 30 is not internally closed with the normally open contact and electrical control circuit 53 is open-circuited therein shutting off the flow of gas through the flow circuit 11. Main switch 42 is in the "neutral" position making connection with neither the "fry" contact nor the "melt" contact. Thermostat 46' is connected to the other "on" contact of spring switch 45. The common pole of main switch 42 is connected to the thermostat 46'. The common terminal of the fat melter control 47 is connected to the "melt" contact of the main switch 42. One of the terminals of the fat melter control 47 is connected to ground 37. The "fry" contact of main switch 42 is connected to the other terminal of the fat melter control 47 and to the "high" side terminal on the normally open solenoid valve 118. The other terminal on solenoid valve 118 is connected to ground 37. The "high" side terminal on the normally closed solenoid valve 116 is connected to one common terminal of the spring switch 45. The spring switch 45 is thrown in the "momentary" position internally connecting the one common terminal and the one momentary contact within spring switch 45. The other terminal on solenoid valve 116 is connected to ground 37.

During "melt" of the fat melter-fryer, as shown in FIG. 9, the main switch 42 is thrown to the "melt" position and the spring switch 45 is left to return to its normally on position. The runner tube 22 is lit by the perpetual pilot 34. The control panel and box 44 electrical hook-up comprises a high limit heat-fuse 38 connected to the "high" side of terminal box 51. The common contact of flame switch 30 and one "momentary" contact of spring switch 45 are connected in parallel to the heat-fuse 38. The normally open contact of the flame switch 30 is connected to one "on" contact and to the other common terminal of the spring switch 45 and in the presence of flame in the runner tube 22 is internally connected to the common contact therein. Main switch 42 is in the "melt" position and the spring switch 45 is in the normally "on" position. Thermostat 46' is connected to the other "on" contact of spring switch 45. The common pole of main switch 42 is connected to the thermostat 46'. The common terminal of the fat melter control 47 is connected to the "melt" contact of the main switch 42. One of the terminals of the fat melter control 47 is connected to ground 37. The "fry" contact of main switch 42 is connected to the other terminal of the fat melter control 47 and to the "high" side terminal on the normally open solenoid valve 118. The other terminal on solenoid valve 118 is connected to ground 37. The "high" side terminal on the normally closed solenoid valve 116 is connected to one common terminal of the spring switch 45. The other terminal on solenoid valve 116 is connected to ground 37. In the absence of flame in the runner tube 22, the common contact in flame switch 30 is not internally closed with the normally open contact and electrical control circuit 53 is open-circuited therein shutting off the flow of gas through flow circuit 11.

During "fry" of the fat melter-fryer, as shown in FIG. 10, the main switch 42 is thrown to the "fry" position and the spring switch is left at its normally on position. The runner tube 22 is lit by the perpetual pilot 34. The control panel and box 44 electrical hook-up comprises a high limit heat-fuse 38 connected to the "high" side of the terminal box 51. The common contact of flame switch 30 and one "momentary" contact of spring switch 45 are connected in parallel to the heat fuse 38. The normally open contact of the flame switch 30 is connected to one "on" contact and to the other common terminal of the spring switch 45 and in the presence of flame in the runner tube 22 is internally connected to the common contact therein. Main switch 42 is in the "fry" position and the spring switch 45 is in the normally "on" position. Thermostat 46' is connected to the other "on" contact of spring switch 45. The common pole of main switch 42 is connected to the thermostat 46'. The common terminal of the fat melter control 47 is connected to the "melt" contact of the main switch 42. One of the terminals of the fat melter control 47 is connected to ground 37. The "fry" contact of main switch 42 is connected to the other terminal of the fat melter control 47 and to the "high" side terminal on the normally open solenoid valve 118. The other terminal on solenoid valve 118 is connected to ground 37. The "high" side terminal on the normally closed solenoid valve 116 is connected to the one common terminal of the spring switch 45. The other terminal on solenoid valve 116 is connected to ground. In the absence of flame in the runner tube 22, the common contact in flame switch 30 is not internally closed with the normally open contact and electrical control circuit 53 is open-circuited therein shutting off the flow of gas through flow circuit 11.

Although several specific embodiments of this invention have been herein shown and described, it will be understood that the details of construction shown may be altered or omitted without departing from the spirit of the invention as defined by the appended claims.

We claim:

1. A two-stage gas supply system for deep-fat melter-fryer burners comprising:
   a. a gas source;
   b. a single gas line having its inlet end connected in fluid communication with an outlet from the source;
   c. a flow-control valve having a remote control input and having its inlet connected in fluid communication with the outlet from the gas line and its outlet in fluid communication with the inlet to the melter-fryer burners;
   d. a fat fryer control means having its input operationally connected to a power supply and its output operationally connected to the remote control input of the flow-control valve for controlling the supply of gas to the burners supplying heat to the melted fat for purposes of frying;
   e. a fat melter control means having its input operationally connected to the output of the fat fryer control means, and its output operationally connected to the remote control input of the flow-control valve for controlling the supply of gas to the burners supplying heat to melt the solid fat; and
   f. selection means operationally connected to both the fat fryer control means and the fat melter control means for mutually excluding the operation of each one from the other.

2. A two-stage gas supply system for a deep fat fryer-melter as set forth in claim 1 wherein the fat fryer control means comprises a thermostat.

3. A two-stage gas supply system for a deep fat fryer-melter as set forth in claim 1 wherein the fat melter control means comprises an "infinite timer" for supplying electrical signals to cyclically operate the flow-control valve a set closed period followed by a set open period.

4. A two-stage gas supply system for a deep fat fryer-melter as set forth in claim 1 wherein the mutually exclusive selection means comprises a double-pole, double-throw switch having its input operationally connected to the output of the fat fryer control means and each of its double-pole outlets operationally connected to each of the inputs of the fat melter control means and the flow-control valve, respectively.

5. A two-stage gas supply system for a deep fat melter-fryer as set forth in claim 1 wherein the flow-control valve having a remote control input comprises a solenoid-operated shutoff valve.

* * * * *